United States Patent [19]

Snead

[11] 4,416,342

[45] Nov. 22, 1983

[54] APPARATUS AND METHOD FOR WEIGHING ROLLING RAILCARS

[76] Inventor: Edwin D. Snead, Box 798, Georgetown, Tex. 78626

[21] Appl. No.: 336,893

[22] Filed: Jan. 4, 1982

Related U.S. Application Data

[63] Continuation-in-part of Ser. No. 247,801, Mar. 26, 1981, abandoned.

[51] Int. Cl.³ .......................... G01G 21/22; G01G 3/14
[52] U.S. Cl. ..................................... 177/163; 177/211
[58] Field of Search ................................ 177/163, 211

[56] References Cited

U.S. PATENT DOCUMENTS

| | | | |
|---|---|---|---|
| 3,155,184 | 11/1964 | Raskin | 177/163 |
| 3,159,227 | 12/1964 | Raskin et al. | 177/163 |
| 3,356,170 | 12/1967 | Cory et al. | 177/163 |
| 3,446,298 | 5/1969 | Cory et al. | 177/163 X |
| 3,448,424 | 6/1969 | Laimins | 177/163 X |
| 3,734,216 | 5/1973 | Nordstrom et al. | 177/163 X |
| 3,741,327 | 6/1973 | Nordstrom et al. | 177/163 |

Primary Examiner—George H. Miller, Jr.

[57] ABSTRACT

A weigh section of a railway track consists of two unsupported spans of conventional rail, produced by removing two adjacent supporting ties for example. The span of the unsupported rails is approximately 64 inches, less than the minimum distance between adjacent axles of a railcar. Four strain gauges are mounted on the under surface of the unsupported rail span of each rail, the four gauges consisting of two pairs of outboard and inboard gauges located in respective halves of the unsupported span. The outputs of the four strain gauges for an unsupported span are summed by adding the outputs of the inboard gauges and subtracting the outputs of the outboard gauges. This sum produces a constant value representative of the load supported on the rail as the axle load moves between the two inboard gauges. A limit switch tripped by a wheel of each axle activates a computer. The computer accumulates a plurality of sum samples while an axle moves between the two inboard gauges, averages the sum samples to produce average load value for each axle of a car, and converts the accumulation of average values to the total car weight.

28 Claims, 5 Drawing Figures

APPARATUS AND METHOD FOR WEIGHING ROLLING RAILCARS

This is a continuation-in-part of application Ser. No. 06/247,801, filed Mar. 26, 1981 now abandoned.

This invention relates to a weighing system and method utilizing the track rails as an essential part of the weighing system.

Scales capable of weighing railcars coupled and in motion have been in operation for more than ten years. The most successful design consists of a weighbridge about 5 feet long (less than the distance between axles) mounted on four load cells. The bridge and load cells are mounted in a concrete structure about 4 feet deep, and the approaching rail at both ends of the weighbridge is set in concrete for a distance of 50 to 100 feet to provide a level approach. Limit switches are set at each end of the weighbridge to sense the passing of wheel flanges, and to signal the electronic control circuits to add the weight of the current axle to the sum of axle weights previously weighed. After a human operator activates the system to initiate a weigh sequence, the electronic control circuit automatically records and accumulates the weight of four successive axles of a 4-axle railcar, and then resets the accumulator to zero to accumulate the weight of the next four axles of the succeeding railcar. While systems of this type perform the desired function, they have a number of disadvantages. The pit tends to collect water which can damage the load cells and associated circuitry, requiring more frequent maintenance. The usual requirement for a stiff, solid support results in the use of massive and expensive foundations. In addition to the expense of such foundations, the track on which such installation is to be installed must necessarily be out of service for a period of from four to six weeks for example.

A system which measures weight by sensing the deflection of an ordinary, or very slightly modified, rail of the railroad track could eliminate these problems, and would make it practical to have scales in many more locations. Systems of this type have been disclosed. One such system is described in Raskin U.S. Pat. No. 3,155,184, issued Nov. 3, 1964. This system includes a relatively short weigh section of rail which is supported at its ends and isolated structurally from the adjacent approaching rail. Strain gauges are secured to the bottom of the weigh rail at opposite sides of the midpoint to detect the bending moment of the rail as it is deflected downward by the weight imposed by the railcar wheel. A principal disadvantage of this system is that is requires the weigh section to be isolated from the adjacent rail. As the train rolls over the gap at the end of the weigh section there is a bump which starts an oscillation in the railcar springs and frame producing erratic readings in the sensors.

Another system of this type is disclosed in Nordstrom, et al, U.S. Pat. No. 3,734,216, issued May 22, 1973. This system disclosed a weigh section of rail which may be integral with the approach rails at the rolling surface, to eliminate any rail break between the weigh section and the approach sections, but the weigh section is structurally and functionally isolated from the approach rail to eliminate any bending moment between the weigh section and the approach rails. In the Nordstrom, et al, system strain gauges are located at the sides of the rails to detect sheer forces imposed on the rail (rather than bending moments) when the rail is deflected downward. There is some difficulty in locating the "inflection points" where such strain guages must be located. While Nordstrom represents that the load need not be measured when the wheel is at the precise midpoint of the weigh section, it appears that the accuracy of such measurement would be subject to question away from that midpoint. Also, in order to provide a system where the weight may be detected away from the midpoint, the weigh rail must be substantially modified with rigidifying structure.

A principal object of this invention is to provide a weighing system and method wherein the weighing section of the rail is integrally connected to the approach rails at both ends and is preferably an integral section of a continuous length of rail.

Another object of this invention is to provide a weighing system which is much simpler in construction and much less expensive to install than systems now in use.

A further object of this invention is to provide a weighing system which may be installed very readily in an existing railroad track, requiring that the track be out of service for only a few hours to accomplish the installation.

Another object of this invention is to provide a novel weighing system and method utilizing a rail span integrally connected to approach rails at both ends of the span, and which provides accurate measurement of the wheel load with the approach rails being supported in a conventional manner.

A still further object of this invention is to provide a weighing system and method wherein a wheel load may be accurately measured over a substantial length of the weigh span or section, thereby eliminating inherent errors of single point weighing.

These objects are accomplished broadly in a weighing system which comprises a span of unsupported rail rigidly connected to supported rail at each end of the span, the span having a length less than the minimum distance between adjacent axles of a railcar. Means are mounted on the span at four measuring points therealong for producing electric signals corresponding to the vertical bending moments at those measuring points. The four measuring points consist of two pairs of measuring points, each pair disposed in a respective half span; and the points of those pairs are spaced approximately the same distance from each other. Means are provided for summing the signals of the four signal producing means to yield a constant sum, while a railcar axle moves between the two inboard measuring points. More particularly, the signal producing means are strain gauges mounted on the underside of the span at the measuring points.

These objects are also accomplished in a method which includes the following steps: providing a span of unsupported rail rigidly connected to supported rail at each end of the span, the unsupported span having a length less than the minimum distance between adjacent axles of a railcar; measuring the vertical bending moments on the unsupported span at four points therealong, the measuring points consisting of two pairs each disposed in a respective half of the span, and the points of those pairs being spaced approximately the same distance from each other; and summing the moments of the four measuring points.

The novel features and the advantages of the invention, as well as additional objects thereof, wil be understood more fully from the following description when read in connection with the accompanying drawings.

DRAWINGS

DESCRIPTION OF THE PREFERRED EMBODIMENT

Figure 1:
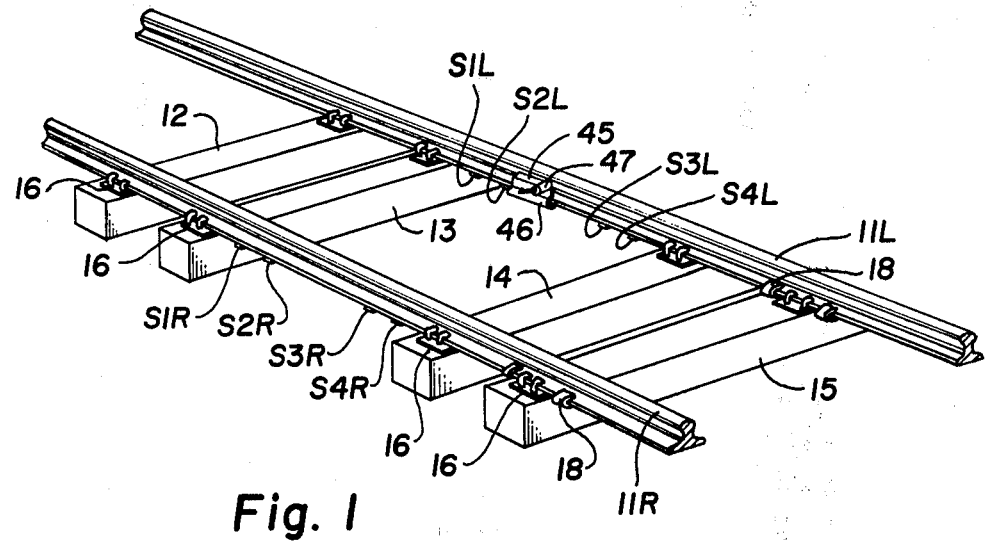
FIG. 1 is a perspective view of a section of railroad track embodying the invention.

FIG. 1 of the drawing illustrates a section of railroad track consisting of conventional rails 11L and 11R supported on conventional ties 12, 13, 14 and 15. At the center of the track section illustrated in FIG. 1 the rails are unsupported for a span represented by the removal of two ties for example between the illustrated ties 13 and 14. The length of the unsupported span L of the rails 11L and 11R is approximately 64 inches; and that span is chosen because that distance is less than the minimum distance between adjacent wheels of railcars to be measured, about 70 inches for example. With this selected distance of the span L, only the wheels of one common axle will be supported on the side-by-side span of the two rails 11L and 11R at any one time.

As indicated in the drawings, the rails which provide the weigh span L are continuous rails of conventional design which will be joined to adjacent rail sections by conventional means of forming joints. Desirably, the rails which form the weigh span L are approximately 8 feet long, so that the joints will be approximately 4 feet from the center of the weigh span. With this length, there will be no variation resulting from an adjacent axle passing a joint while one axle is being weighed in the measurement span to be described. This length of rail is readily handled for the fabrication of a weigh span rail.

Figure 2C:
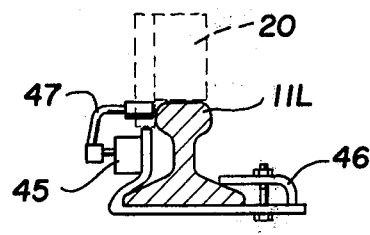
FIG. 2C is a detail view of the limit switch mounting, as viewed from the right in FIG. 2A.
Figures 2A, 2B:
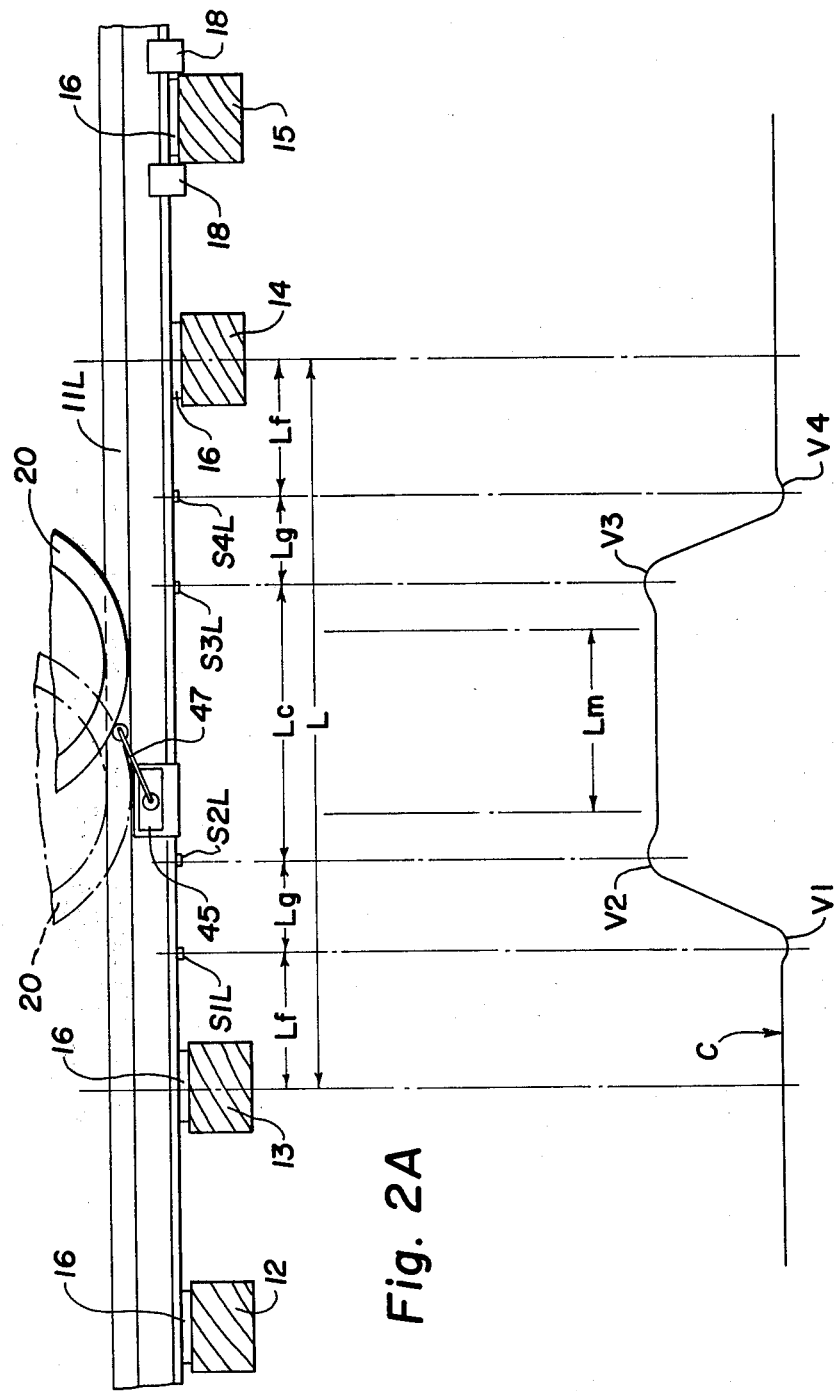
FIG. 2A is a side elevation view of one of the rails of FIG. 1, as viewed from the inner face of the rail.
FIG. 2B is a diagram of summed bending moments in a portion of the rail of FIG. 2A caused by an axle load moving along the rail.

FIG. 2A is a side elevation view of the inner face of the rail 11R and the supporting ties. The rail is supported on the ties through conventional tie plates 16. The inboard ties 13 and 14 define the span L, and provide fulcrums for the downward bending of the rail span L under the effect of an axle load supported on the weighing span.

The applicant has discovered that if the bending moments along the weigh span L are measured at four points therealong, to be described, the sum of these bending moments will be a constant value over a significant portion of the weigh span at the center thereof (about one-quarter of the weigh span, for example); and therefore, using the measurement of the sum of these moments as an indication of the supported load, the measurement of that load might be taken during a finite wheel travel distance along the span.

The applicant has discovered that the above mentioned constant value of the sum of moments will occur if two pairs of gauges are placed on respective halves of the weigh span, each pair consisting of an outboard gauge disposed toward the adjacent span fulcrum and an inboard gauge disposed toward the span center, that the spacing between the outboard and inboard gauges of both pairs is approximately the same, and that the sum is taken by adding the measured values of the inboard gauges and substracting the measured values of the outboard gaugestwo pairs is exactly the same, assuming that the rail is exactly uniform. Accordingly, as seen in FIG. 1, strain gauges S1L, S2L, S3L and S4L are placed on the bottom of the rail designated 11L, and strain gauges S1R, S2R, S3R and S4R are placed on the bottom surface of the rail designated 11R.

FIG. 2B of the drawing depicts curve C which is a diagrammatic illustration of the sum of bending moments indicated by the strain gauges S1L, S2L, S3L and S4L, and is projected vertically from the side elevation view of the rail in FIG. 2A to identify the sum of moments in relation to the weigh span L and the location of the stran gauges on the weigh span as a wheel load traverses the weigh span. The actual positions of the strain gauges, relative to the weigh span L, may vary within the above mentioned limitations and also within other limitations to be described. As has been mentioned, a weigh span L, the distance between the fulcrums may be 64 inches for example. The distances between the outboard strain gauges S1L and S4L and the respective fulcrums are indicated by the symbol Lf; the distances between the respective outboard and inboard gauges of the two pairs are indicated by the symbol Lg; and the center distance between the two inboard gauges S2L and S3L is indicated by the symbol Lc. These distances and selected to attain the best results from the standpoint of accuracy and sensitivity. A factor to be considered is a distortion referred to as the St. Venant distortion, which appears on the curve C in FIG. 2B as bulges V1, V2, V3 and V4; and these distortions represent the erroneous readings which are produced when a wheel load is directly over a strain gauge; and these readings must be disregarded when taking the readings which represent the load on the weigh span. Referring to the curve C of FIG. 2B it will be seen that the measurement span Lm, through which the above mentioned constant value of the sum of moments will occur, is considerably shorter than the center span Lc between the inboard gauges S2L and S3L; and the reason for this is the St. Venant distortion. It is desirable that the measurement span Lm be made as long as possible so that a significant number of readings may be averaged out while a wheel 20 traverses this span; and it will be apparent that if the span is longer, the speed of the passing railcar may be increased and still allow for a significant number of readings to obtain a very accurate average. Accordingly the distance Lc should be as large as possible, desirably at least one-third that of the weigh span L. The distances Lg are not critical; however these distances have a bearing on the sensitivity of the scale output. With an increase in the distance Lg, the total output per pound increases and accordingly the scale output, when amplified, is more accurate. The distance Lf are not critical except that the outboard gauges S1L and S4L must be spaced a sufficient distance from the respective fulcra to avoid any effect from the St. Venant distortion.

It will be seen then that there may be some tradeoff in selecting the gauge locations to achieve optimum results. By way of example, the distances Lf may be 8 inches each, the distances Lg may be 10 inches each, and the center distance Lc may be 28 inches. Allowing ample distance for the effect of the St. Venant distortion at points V2 and V3, the measurement span Lm will be a minimum of 14 inches.

The curve C, representing the summation of moments in FIG. 2B, has been extended beyond the weigh span L to include portions of the approach rails at either end of the weigh span. It has been discovered by experimentation that the sum of moments measured in the weigh span will remain constant while a wheel 20 rolls from left to right on the rail 11L illustrated in FIG. 2A for a distance to the left of the tie 13 corresponding to the span L and for several inches to the right of the tie 13 and its fulcrum plate 16, and that this sum is not affected by wheel loads to the left of the tie 13 or to the right of the tie 14. When the wheel load moves directly over the strain gauge S1L there is a slight negative dip V1 in the summation of the curve, and this is an erroneous indication referred to as the St. Venant distortion which occurs when the load is directly over a strain gauge. As the load moves between the outboard strain gauge S1L and the inboard strain gauge S2L, the sum of moments curve increases to a maximum value represented again by St. Venant's distortion V2 as the load moves directly over the inboard gauge S2L. As the load moves between a point slightly beyond gauge S2L to a point approaching the other inboard gauge S3L, the sum of moments is a constant value and is not affected by loads outside the weigh span. This span of rail wherein the sum of moments is constant is referred to as the measurement span Lm. In the described example, this measurement span Lm would have a length at least of 14 inches depending on the effect of the St. Venant distortion. As the load continues to move toward the right, the sum of moments curve repeats itself in a symmetrical way relative to the inboard and outboard gauges S3L and S4L and the approach rail to the right of the tie 14 and associated tie plate 17.

Since the sum of moments is constant as the load traverses the measurement span Lm, in theory, an accurate measurement of the load may be taken at any point in this span.

If it is assumed that a railcar is moving across the weigh span at a speed of three miles per hour or 53 inches/sec, the time for the wheel to traverse the measurement span Lm is approximately 0.26 seconds. There is at least 0.26 seconds then during which a theoretically accurate measurement of the traversing load may be taken. It must be recognized, however, that there are external factors which effect the load on the rail at any particular instant including vertical oscillations of the wheel relative to the car and impact loads caused by a flat surface on the wheel. Because of these external factors, it is unlikely that a single instantaneous reading taken at any time while the load is over the measurement span would be a true reading of the load. An important aspect of the applicant's invention, enabled by the significant distance of at least 14 inches through which an accurate measurement may be taken, is to take a number of readings of the load or moment while the load traverses the measurement span Lm and then take an average of these readings to obtain a true indication of the actual load. The manner of doing this will be described subsequently.

Figure 3:
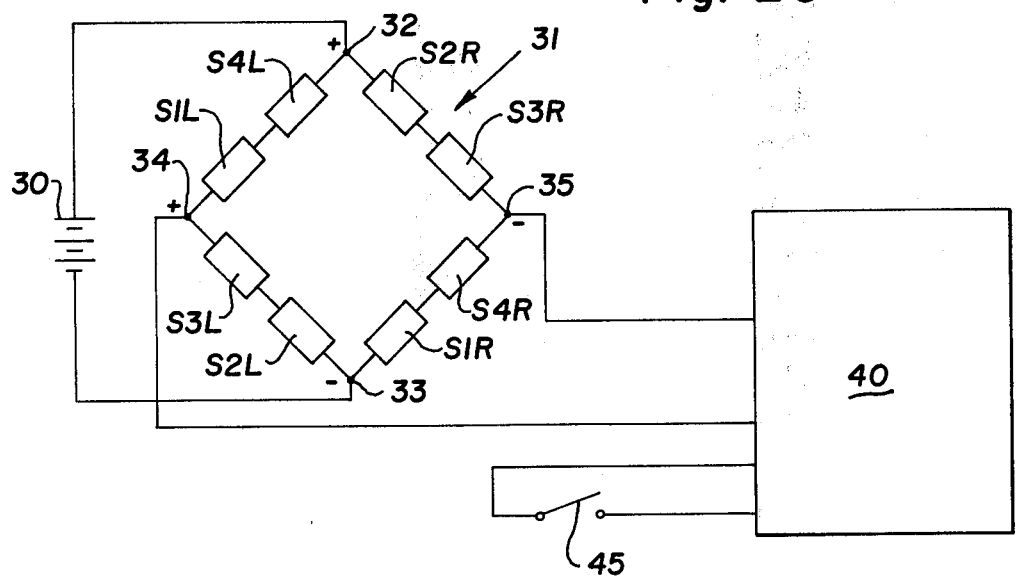
FIG. 3 is a schematic circuit diagram of a portion of the weighing system.

FIG. 3 of the drawing is a schematic and diagrammatic illustration of one form of electronic hookup and system for taking the readings representing the loads imposed by a railcar and determining the total weight of that car.

FIG. 3 illustrates a bridge circuit wherein the eight strain gauges S1L through S4L and S1R through S4R are connected in desired relation to produce an output which represents the total load on the two rails 11L and 11R by the two wheels of a common axle. This circuit includes a DC voltage source 30 which is connected across the bridge circuit 31 at points 32 and 33. The bridge output is taken at opposite diagonal bridge points 34 and 35. The output of the bridge circuit is fed to a computer 40. A limit switch 45 controls the input from the bridge circuit to the computer.

Referring to FIGS. 1, 2A, and 2C the limit switch 45 is mounted on the rail 11L, by means of a bracket 46; and this switch includes an actuator arm 47 and associated roller positioned to be engaged by the flange of a wheel 20 traversing the rail. As best seen in FIG. 2A, the switch arm roller which is engaged by the wheel flange is disposed approximately at the center of the weigh span L; and the arm 47 has an upper limit position, which is the position illustrated in FIG. 2A. This switch is disposed and arranged to allow the computer to read an output signal from the bridge during the time when the wheel 20 is traversing the measurement span LM of the weigh span. In FIG. 2A the wheel 20 is indicated in broken lines as it has just passed the strain gauge S2L and is entering the leading side of the measurement span at which point the arm 39 will be depressed downwardly by the wheel flange to close the switch. The switch 45 will remain closed as the wheel moves from that point to the point indicated by the solid lines when the wheel flange has allowed the arm 47 to return, under an internal biasing force, to its limit position where the switch is opened. It will be seen then that this switch 45 is closed during substantially the full time that the wheel traverses the measurement span Lm; and that this will occur regardless of which direction the wheel 20 traverses the rail 11L. In other words the system functions identically regardless of the direction in which a railcar traverses the weight span of the system.

The detecting of the bridge output and the converting of that output to the weight of a complete railcar would be controlled by the computer responding to input signals as controlled by the switch 45, provided that a weigh cycle is initiated by a human operator to assure that the weigh cycle will begin with the first axle of a given railcar. The functions of the computer may include the following:

1. The computer counts the input cycles initiated by the switch 45 for each of four axles.
2. When the first input cycle is initiated the computer takes and accumulates N(128 for example) successive intermittent readings of the bridge output during a period of approximately 0.26 seconds while the axle traverses the measurement span Lm and while the switch 45 is closed.
3. The accumulated N readings are divided by N to determine an average load value for the axle.
4. Store the axle load value.
5. Count the second input cycle initiated by the tripping of the switch 45 by a wheel of the second axle.
6. Repeat steps 2, 3 and 4.
7. Count the third input cycle initiated by the closing of the switch 45 by a wheel of the third axle.
8. Repeat steps 2, 3 and 4.
9. Count the fourth input cycle initiated by the closing of switch 45 by the fourth axle.
10. Repeat steps 2, 3 and 4.
11. Sum the stored load values for the four axles.
12. Multiply the sum by a factor to convert it to the total weight of the railcar.

13. Printout.

The system is extremely accurate in measuring the load values for each axle because it takes an average of numerous readings, thereby cancelling out any erroneous readings which occur in that group.

It will be seen that a weighing system as described may be installed in an existing railroad track in a very short period of time. A rail section about 8 feet long, with strain gauges attached, is installed in place of the existing rail and coupled to the adjoining existing rail with conventional angle bars. Two adjacent ties are removed to produce a span of approximately 64 inches between the then adjacent ties; and the ballast associated with these removed ties may also be partially removed to allow room for the strain gauges on the underside of the rail. The switch 45 is mounted on a suitable bracket support 46 secured to one rail, to position the actuator arm roller at the desired point at the center of the span L. It is then only necessary to connect electrically the several strain gauges and the switch 45 to the electronic portions of the weighing system. It has been found that this system will function in the indicated manner with the rails of the weigh span L entirely unsupported between the fulcrum ties.

Recognizing that it is possible for the rails 11L and 11R to shift longitudinally relative to the supporting ties, resulting possibly from sudden acceleration of the locomotive or from braking of the train, it may be desirable to include rail anchors 18 for minimizing such longitudinal movement in the area of the weighing span; which are clamped to the rail projecting downward from the underside thereof, and positioned in abutting relation with selected ties. Two of such anchors are illustrated in FIG. 2 in abutting relation respectively with the ties 12 and 15 to minimize longitudinal movement of the rails in either direction. Additional rail anchors may be clamped to the rail abutting several adjacent ties at both ends of the weight span.

It will be apparent from the foregoing description that a weighing system as above described may be installed in an existing railroad track in a matter of hours, so that the use of that section of track for regular purposes is interrupted for only a very short period of time.

Method

The above described system is representative of a method for weighing railcars in motion; and the following is an outline of various steps in the practice of such method.

Broadly the method may include the steps: providing a span of unsupported rail rigidly connected to supported rail at each end of the span, with the unsupported span having a length less than the minimum distance between adjacent axles of the railcars; measuring the bending moments, imposed on the unsupported span by a railcar wheel load, at four measuring points therealong; the measuring points consisting of two pairs of outboard and inboard points, one pair disposed in each half of the span; and the points of those pairs being spaced approximately the same distance from each other; summing the bending moments at the four measuring points to produce a value representing the railcar wheel load.

More specific method steps include the steps: summing the moments at the four measuring points by adding the inboard moments and subtracting the outboard moments; and summing those bending moments when the wheel axle is moving between the two inboard measuring points.

With respect to the spacing of the inboard measuring points, the method may include spacing those points about one-third the length of the span, or spacing those points about twice the distance of the St. Venant distortion range.

Another more specific aspect of the invention includes the steps: determining a weigh span between the two inboard measuring points which span is free of the St. Venant distortion range at those inboard measuring points; and summing the bending moments when the wheel axle is moving within that weigh span.

Other more specific aspects of the method include: detecting the summed moments in a plurality of successive samplings; and accumulating and averaging the samplings to produce an average sum of moments representing the weight supported by a wheel; and accumulating the average sum of moments for each wheel of a railcar, the accumulated sum representing the total weight of a railcar.

While the above described steps contemplate the measuring of moments on a single rail span, which would of course represent the weight of a railcar only to the extent that the weight is balanced about a center line between the two rails, the method may include the step of providing spans of unsupported rail in each of a pair of side-by-side rails to be traversed simultaneously by the two wheels of a common railcar axle; and measuring the bending moments of both spans in the same manner.

The method may include additional more detailed steps including: mounting a strain gauge on the underside of each span at each of the four measuring points, for producing electric output signals corresponding to the bending moments at the measuring points, and summing electrically whose output signals; providing the unsupported span and the rigidly connected supported rails as a continuous length of conventional rail; and providing fulcrum supports in the form of conventional ties and tie plates for the supported rail, to define the ends of the unsupported span.

What has been described are a novel apparatus and method for weighing railcars while rolling on a railroad track.

An important feature and advantage of the invention is that the measurement of values corresponding to an axle load may be taken for a sufficiently long period of time that multiple samples of that measured value may be taken, and an average value computed to produce a very accurate measure of the axle load. Another important feature of the invention is that the weighing system utilizes conventional rail which may be the existing rail of an existing track (or only slightly modified rail) thereby minimizing the manufacturing costs and the installation time for the system. A related important feature is that the system may be installed in an existing track with minor structural modification of the existing rails, rail supports and bed, with the result that the structural parts of the system are very inexpensive to install relative to known operative systems, and that the installation time is very short. An existing track need only be out of service for a period of several hours to effect the structural modifications to the track. A related advantage is that the cost of the system is much less than that of known operative systems, and that therefore duplicate weighing systems may be installed at several places in a rail yard, for example.

While preferred embodiments of the invention have been illustrated and described, it will be understood by those skilled in the art that changes and modifications may be resorted to without departing from the spirit and scope of the invention.

What is claimed is:

1. A system for weighing railcars in motion comprising
    a length of rail of generally uniform cross section supported at opposite ends in the manner of conventional rail; said length of rail including an unsupported section intermediate its ends, defining a weigh span; said weigh span having a length less than the minimum distance between adjacent axles of said railcars;
    means mounted on said weigh span at four respective measuring points therealong for producing electric signals corresponding to the respective bending moments at said measuring points; said four measuring points comprising two pairs of points, each pair consisting of an outboard and inboard point, and each pair being disposed in a respective half of said weigh span; the points of said pairs being spaced approximately the same distance from each other; means for summing the signals of said four signal producing means while a railroad axle moves between said two inboard measuring points.

2. A system as set forth in claim 1
    said summing means comprising means for adding said signals of said inboard signal producing means and for subtracting said signals of said outboard signal producing means.

3. A system as set forth in claim 1
    said inboard points being spaced from each other a distance at least one-third the length of said weigh span.

4. A system as set forth in claim 1
    said inboard points being shaped from each other a distance allowing axle traversal time of about 0.26 seconds at a railcar velocity of 53 inches/second.

5. A system as set forth in claim 1
    said inboard points being spaced from each other at least twice the distance represented by the St. Venant's distortion range.

6. A system as set forth in claim 1
    said outboard points being spaced from the respective ends of said weigh span a distance to be free of St. Venant's distortion.

7. A system as set forth in claim 1
    said signal producing means comprising strain gauges.

8. A system as set forth in claim 1
    a pair of said weigh spans aligned laterally in the two rails of a railroad track.

9. A system as set forth in claim 1
    fulcrum support means for supporting said length of rail at the ends of said weigh span, said fulcrum support means defining the length of said span; said fulcrum support means comprising conventional ties and tie plates.

10. A system as set forth in claim 1
    said signal producing means comprising strain gauges mounted on the under surface of said weigh span to detect the longitudinal expansion or contraction of said under surface.

11. A system as set forth in claim 10
    said strain gauges being connected in a bridge circuit for summing the output thereof and producing a bridge circuit output corresponding to the load supported by said weigh span.

12. A system as set forth in claim 1
    means for detecting said summed moments in a plurality of successive samplings while a railcar axle moves between said inboard measuring points; and means for averaging said samplings to produce an average sum of moments representing the weight supported by a railcar wheel.

13. A system as set forth in claim 12
    means for summing said average sum of moments for each wheel of said railcar, to produce a sum representing the total weight of said railcar.

14. A system as set forth in claim 1
    said length of rail comprising conventional rail.

15. A system as set forth in claim 14
    said length of conventional rail having a uniform unmodified cross section.

16. A method for weighing railcars in motion comprising the steps
    supporting a length of rail of generally uniform cross section at its opposite ends in the manner of conventional rail, thereby providing an unsupported section of said rail intermediate its ends to define a weigh span;
    spacing the supports for said length of rail to provide said weigh span with a length less than the minimum distance between adjacent axles of said railcars;
    measuring the bending moments, imposed on said weigh span by a railcar wheel load, at four measuring points therealong consisting of two pairs of outboard and inboard points; positioning one of said pairs of measuring points in each half of said weight span, with the points of said pairs spaced approximately the same distance from each other;
    summing the bending moments at said four measuring points.

17. A method as set forth in claim 16 including
    summing said bending moments when a wheel axle is moving between said two inboard measuring points.

18. A method as set forth in claim 16 including
    summing said bending moments at said four measuring points by adding the inboard moments and substracting the outboard moments.

19. A method as set forth in claim 16 including
    determining a measurement span between said two measuring points, which measurement span is free from the St. Venant distortion range at said inboard measuring points;
    and summing said bending moments when the wheel axle is moving within said measurement span.

20. A method as set forth in claim 16 including
    spacing apart said inboard measuring points about at least ⅓ the length of said weigh span.

21. A method as set forth in claim 16 including
    detecting said summed moments in a plurality of successive samplings; and accumulating and averaging said samplings to produce an average sum of moments representing the weight supported by said wheel.

22. A method as set forth in claim 16 including
    providing of said lengths of rail including said unsupported weigh span in each of a pair of side-by-side rails to be traversed simultaneously by the wheels of a common railcar axle; and measuring the bending moments of both spans in the same manner.

23. A method as set forth in claim 16 including mounting a strain gauge on the under surface of said weigh span at each of said four measuring points in a manner to detect the longitudinal expansion or contraction of said under surface, for producing electric output signals corresponding to the bending moments at said measuring points; and summing electrically said output signals.

24. A method as set forth in claim 16 including supporting said length of rail at the ends of weigh span by fulcrum supports in the form of conventional ties and tie plates, to define the ends of said weigh span.

25. A method as set forth in claim 16 including spacing apart said inboard points about twice the distance of the St. Venant distortion range.

26. A method as set forth in claim 25 including accumulating said average sum of moments for each wheel of said railcar, said accumulated sum representing the total weight of said railcar.

27. A method as set forth in claim 16 including providing a length of conventional rail as said supported length of rail.

28. A method as set forth in claim 27 including providing said length of conventional rail having a uniform, unmodified cross section.

* * * * *

UNITED STATES PATENT AND TRADEMARK OFFICE
CERTIFICATE OF CORRECTION

PATENT NO. : 4,416,342

DATED : November 22, 1983

INVENTOR(S) : Edwin D. Snead

It is certified that error appears in the above-identified patent and that said Letters Patent is hereby corrected as shown below:

Column 1, line 51, "is", second occurrence, should read -- it --.

Column 4, line 4, after "gauges" insert -- . Preferably, the distance between the gauges of the --.

Column 4, line 29, after "distances" delete "and" and insert -- are --.

Column 6, line 36, "weight" should read -- weigh --.

Column 7, line 39, "weight" should read -- weigh --.

Claim 1, line 26, "railroad" should read -- railcar --.

Claim 4, line 38, "shaped" should read -- spaced --.

Claim 16, line 35, "weight" should read -- weigh --.

Claim 22, line 64, before "of" insert -- one --.

Signed and Sealed this

Twentieth Day of November 1984

[SEAL]

*Attest:*

GERALD J. MOSSINGHOFF

*Attesting Officer*     *Commissioner of Patents and Trademarks*